United States Patent [19]
Frazier

[11] Patent Number: 5,727,236
[45] Date of Patent: Mar. 10, 1998

[54] WIDE ANGLE, DEEP FIELD, CLOSE FOCUSING OPTICAL SYSTEM

[76] Inventor: James A. Frazier, 1/206 Pacific Highway, Lindfield, New South Wales, Australia, 2067

[21] Appl. No.: 268,420

[22] Filed: Jun. 30, 1994

[51] Int. Cl.⁶ .................................................. G03B 17/00
[52] U.S. Cl. ........................... 396/71; 359/434; 359/733; 359/822
[58] Field of Search ...................... 354/187, 189, 354/286, 195.12; 359/737, 677, 793, 794, 795, 733–735, 676, 822, 784, 367, 434, 435, 726; 396/71, 351, 432, 144

[56] References Cited

U.S. PATENT DOCUMENTS

| | | | |
|---|---|---|---|
| 1,871,165 | 8/1932 | Egy. | |
| 2,293,598 | 2/1942 | Drucker. | |
| 2,821,108 | 1/1958 | Warmishan et al. | 88/57 |
| 3,191,496 | 6/1965 | Cook | 88/57 |
| 3,437,748 | 4/1969 | Latady et al. | |
| 3,655,260 | 4/1972 | Bartucci et al. | 350/45 |
| 3,994,572 | 11/1976 | Uesugi et al. | 350/186 |
| 3,995,557 | 12/1976 | Hopkins | 350/33 |
| 4,000,501 | 12/1976 | Sakaguchi et al. | 354/197 |
| 4,104,649 | 8/1978 | Tanaka et al. | 354/289 |
| 4,195,922 | 4/1980 | Hajnal | 354/79 |
| 4,249,791 | 2/1981 | Helm et al. | 350/16 |
| 4,375,913 | 3/1983 | Hajnal | 354/79 |
| 4,437,745 | 3/1984 | Hajnal | 354/117 |
| 4,449,794 | 5/1984 | Yamada | 350/472 |
| 4,580,886 | 4/1986 | Hajnal | 354/79 |
| 4,588,294 | 5/1986 | Siegmund | 356/241 |
| 4,741,605 | 5/1988 | Alfredsson et al. | 350/422 |
| 4,862,199 | 8/1989 | Centkowski et al. | 354/62 |
| 4,867,549 | 9/1989 | Sekine | 359/434 |
| 4,868,588 | 9/1989 | Hajnal | 354/79 |
| 4,963,910 | 10/1990 | Ishimura | 396/71 |

(List continued on next page.)

FOREIGN PATENT DOCUMENTS

| | | | |
|---|---|---|---|
| 58-48011 | of 1983 | Japan | 15/10 |
| 59-68725 | of 1984 | Japan | 17/16 |

OTHER PUBLICATIONS

Article by Dr. Alfred Schwarz, Photographic Age, Feb. 1949, entitled "Depth of Field in Photographic Objectives".
Article by Michael Barbero, Photographic Age, Feb. 1949, entitled "The Payoff".
Sales literature entitled "From 'American Cinematographer', January, 1980 'The Black Hole'. . . and how it was filmed" by Ernst (Bob) Nettmann, Jan. 1980.

(List continued on next page.)

*Primary Examiner*—David M. Gray
*Attorney, Agent, or Firm*—Lyon & Lyon LLP

[57] ABSTRACT

An optical system having the features of a wide angle lens, a deep field lens and a close focusing lens is comprised of an objective lens, a field lens and a relay lens aligned on an optical axis in that sequence for the objective lens to form an intermediate image at or near the field lens and for the field lens and relay lens to transmit that same image to a smaller final image at the plane of the film of a film camera or charge coupled device of a video camera. The objective lens preferably has a fixed focal length and a wide open aperture for forming the intermediate image of a larger size than is otherwise normal for an objective lens of that focal length. Preferably, the relay lens has the iris and focusing mechanism whereby the objective lens and field lens are not required to be used for aperture control and focusing. The optical system provides an extended optical axis for accommodating lighting of a near object being photographed. In modifications of the basic optical system, the optical axis is turned 90° one or more times and rotatable joints are provided in the lens barrel for versatile positioning of the objective lens relative to the camera with appropriate prisms for inverting and reversing the orientation of the final image at the film or CCD detector plane.

75 Claims, 6 Drawing Sheets

U.S. PATENT DOCUMENTS

| | | | |
|---|---|---|---|
| 4,984,886 | 1/1991 | Yoshida | 356/237 |
| 5,117,246 | 5/1992 | Takahashi et al. | 354/202 |
| 5,189,560 | 2/1993 | Edwards et al. | 359/744 |
| 5,191,475 | 3/1993 | Terasawa et al. | 359/684 |
| 5,237,356 | 8/1993 | Ohtsuka | 354/62 |
| 5,323,200 | 6/1994 | Hirasawa | 351/195.12 |
| 5,430,575 | 7/1995 | Sudarshan et al. | 359/434 |
| 5,459,511 | 10/1995 | Uehara et al. | 348/335 |
| 5,469,236 | 11/1995 | Roessel | 396/432 |
| 5,499,069 | 3/1996 | Griffith | 396/71 |

OTHER PUBLICATIONS

Article entitled "Pitching Lens—A Unique and Versatile Optical Relay System", by Ernst (Bob) Nettmann, American Cinematographer Magazine, Jan. 1980.

Article entitled "Success Story" by Robin Browne, published in GBCT News, Jan./Feb. 1980 Issue.

Technical Achievement Award to Ernst F. Nettmann, Presented March 21, 1982.

Sales brochure entitled "The Pitching Lens System", published by Advanced Camera Systems and distributed between about 1990 and 1992.

Sales brochure entitle "The Pitching Lens System", published by Advanced Camera Systems and distributed between about 1992 to present.

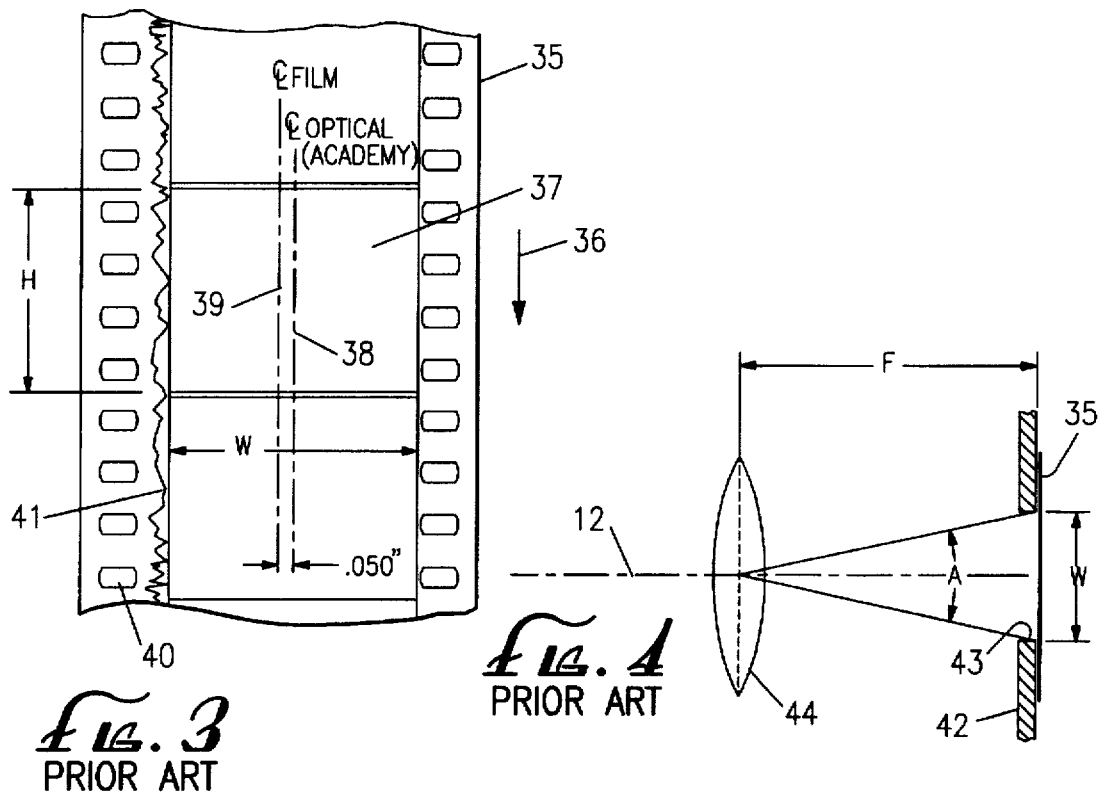

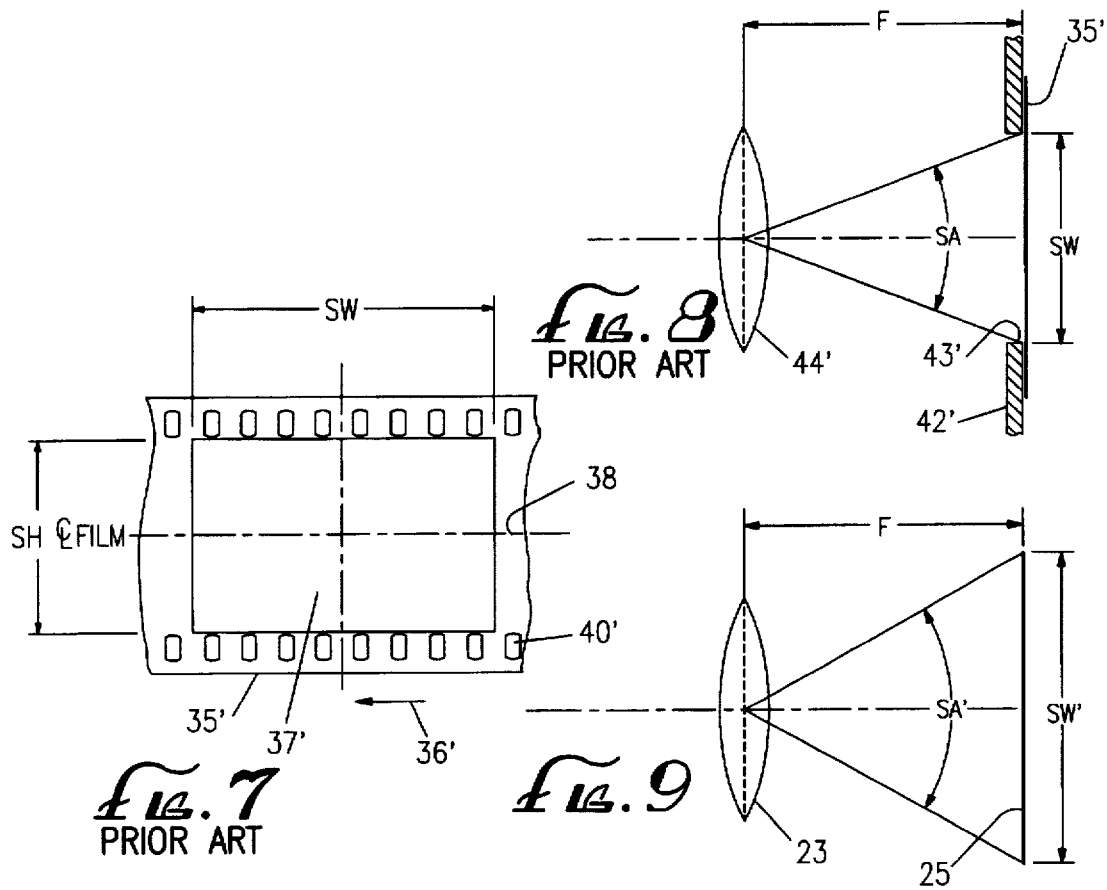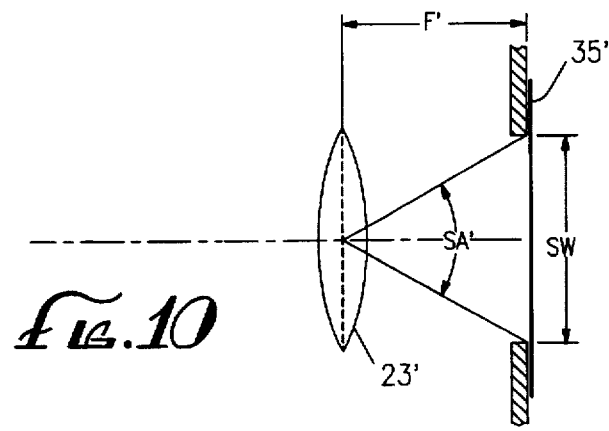

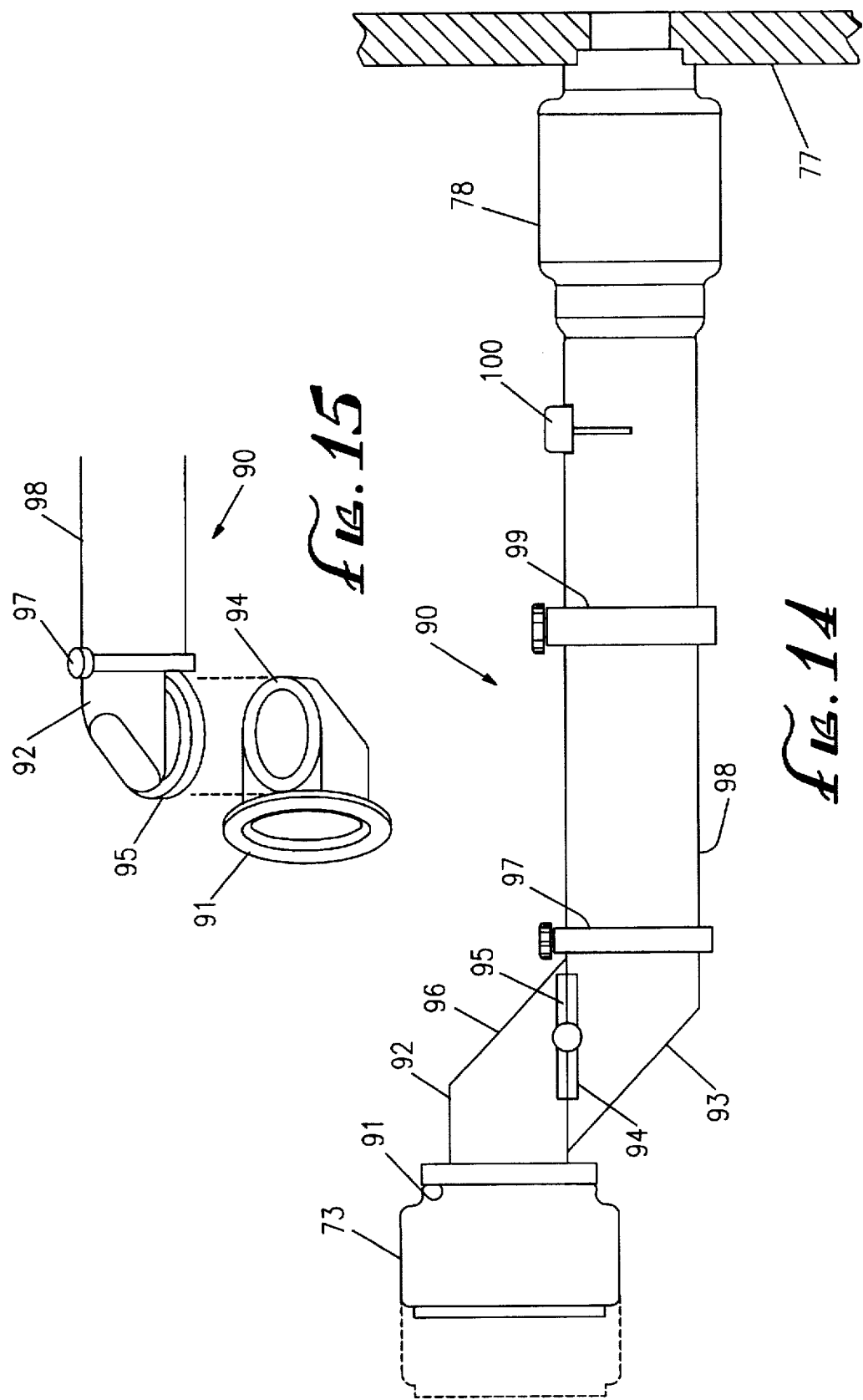

WIDE ANGLE, DEEP FIELD, CLOSE FOCUSING OPTICAL SYSTEM

This invention relates to an optical system for still or motion picture cameras, video cameras or the like and, in particular, is directed to an optical system for producing the features of a wide angle lens, a deep field lens and a close focusing lens, all in one optical system.

In many optical imaging applications, such as for cameras and the like, there is a need to provide a large depth of field so that objects located both near to and far from the camera appear to be in focus to an acceptable degree, as well as the actual object focused upon being in focus. Further, there is a need to expand the depth of field from an object at an optical infinity distance to a near object where the object height to image height ratio, i.e. magnification by the optical system, is less than ten to one (10:1) and possibly as low as one to one (1:1) or less.

One conventional approach used to achieve a large depth of field comprises the use of a short focal length, wide angle lens and stopping down its aperture to an "f" number in the range of f/8 to f/16, i.e. substantially reducing the aperture size, where said aperture range still provides an adequate level of light to obtain an acceptable exposure at the image plane for the film in the camera or the charge coupled device ("CCD") of a video camera. Because of the requirement for a low magnification ratio, the wide angle lens is preferably of a short overall length and the object is placed close to the front optical surface of the lens system. Also, preferably the overall diameter of the lens system, especially at the front, is minimized in order to provide some space and access for lighting of the object which becomes particularly difficult for movie cameras which are larger than still cameras. Moreover, a short length, small diameter, wide angle lens will also have a short back focal length, i.e. the distance between the rear of the lens and the image plane. However, the back focal length distance must be no less than a certain minimum distance because in the case of a reflex film camera that distance tends to be large due to the space required for the reflex mirror between the lens and the image plane and in the case of a video camera that distance tends to be large due to the presence of the necessary beamsplitter optics. Even with a compact wide angle lens with these desirable features, the closeness of the object to the front face of the film camera or video camera would create serious problems in lighting the object, thereby making the optical imaging system impractical for actual use in most applications.

For example, in FIG. 1 of the drawings there is a diagrammatic illustration of a typical optical system of a film or video camera. A lens 10 is mounted on the front face 11 of a camera (not shown) and on an optical axis 12 of the camera. If the camera is of a single lens reflex ("SLR") type, it will have a reflex mirror 13 positioned at a 45° angle to the optical axis 12 inside of the camera and in front of the image plane 14 where the film will be located. The reflex mirror 13 or other mechanism, such as a rotating mirror in a movie film camera or a beamsplitter in a video camera, requires space between the front of the camera and the image plane 14 of a distance U which limits the minimum size of the back focal length of the lens 10. When a close-up picture of an object O is desired, there is a limited amount of space, illustrated by the cross hatched areas L, surrounding the optical path between the camera and the object O that is available for positioning lighting devices for lighting the front of the object O that faces the camera in order to develop a proper exposure on the film or CCD at image plane 14. As discussed above, if the lens 10 is a wide angled lens and the aperture is stopped down to attempt to accomplish focusing of both the near object O and objects at infinity focal distance, the lighting from the areas L becomes even more important and yet the space is very limited because the wide angled lens 10 is short in length and must be set at or near the face 11 of the camera for providing the proper back focal length distance between the lens 10 and the image plane 14. These and other problems of the prior art are overcome by the present invention.

An object of the present invention is to provide an optical system with a large depth of field for adequate focusing on objects located from and between a close focus distance and a relatively large focus distance. A further object of the present invention is to provide such an optical system wherein the image magnification ratio is less than ten to one (10:1).

Another object of the present invention is to provide an optical system for a film or video camera or the like in which an objective lens group has a fixed focal length and open aperture for forming an intermediate image and a second lens group optically transmits the intermediate image to a film or detector plane and forms a final image at that plane of a smaller size than the intermediate image to thereby reduce the effective focal length, increase the effective field of view and increase the apparent depth of field of the objective lens group. Further, it is an object of this invention to provide such an optical system wherein the second lens group includes a field lens group at or near where the intermediate image is formed and a relay lens group nearer the final image, with the relay lens having means for focusing the final image on the film or detector plane. A further object of this invention is to provide such an optical system wherein the relay lens includes means for aperture control. Still further, an object of this invention is to provide such an optical system wherein orientation correction optics are provided in the second lens group for correcting the orientation of the final image by inverting or reversing the final image.

Still another object of the present invention is to provide an optical system that extends the objective lens forward of the camera body a sufficient distance to provide ease of lighting of objects located at a close focus distance with an object to image magnification ratio of down to one to one (1:1) or even less.

A still further object of this invention is to provide an optical system for a film or video camera or the like which substantially extends the length of the optical axis without adversely affecting the image formed at the film or CCD plane for allowing the use of mirrors, prisms or the like to change the direction of the optical axis for using an angled and rotatable lens barrel for taking unique pictures that would be extremely difficult or impossible with a conventional straight lens because of the size and location of the camera.

Other objects, advantages and features of the present invention will appear from the following description of the preferred embodiments and the accompanying drawings.

BRIEF DESCRIPTION OF THE DRAWINGS

FIG. 3 is an elevation view of a portion of 35 mm movie film of the type used for professionally taken films;

FIG. 4 is a diagrammatic plan view of the lens, aperture and film in a motion picture camera using 35 mm film for illustrating the normal field of view;

FIG. 5 is a diagrammatic plan view illustrating the objective lens and intermediate image formed thereby in the optical system of the present invention for illustrating the expanded field of view;

FIG. 6 is a diagrammatic plan view of the effective optical system of the present invention for illustrating the effective field of view in a movie camera using 35 mm film as compared to the conventional system of FIG. 4;

FIG. 7 is an elevation view of a portion of 35 mm film as used in a still camera;

FIG. 8 is a diagrammatic plan view similar to FIG. 4 but illustrating the lens, aperture and film in a 35 mm still camera;

FIG. 9 is a diagrammatic plan view similar to FIG. 5 but illustrating the intermediate image formed by the optical system of the present invention in a 35 mm still camera;

FIG. 10 is a diagrammatic plan view similar to FIG. 6 but illustrating the effective field of view of the optical system of the present invention in a 35 mm still camera as compared to the conventional system of FIG. 8;

FIG. 14 is an elevation view of the lens assembly of the optical systems of FIGS. 12 and 13; and FIG. 15 is an exploded perspective view of a portion of the lens assembly illustrated in FIG. 14.

DESCRIPTION OF THE PREFERRED EMBODIMENTS

Figure 1:
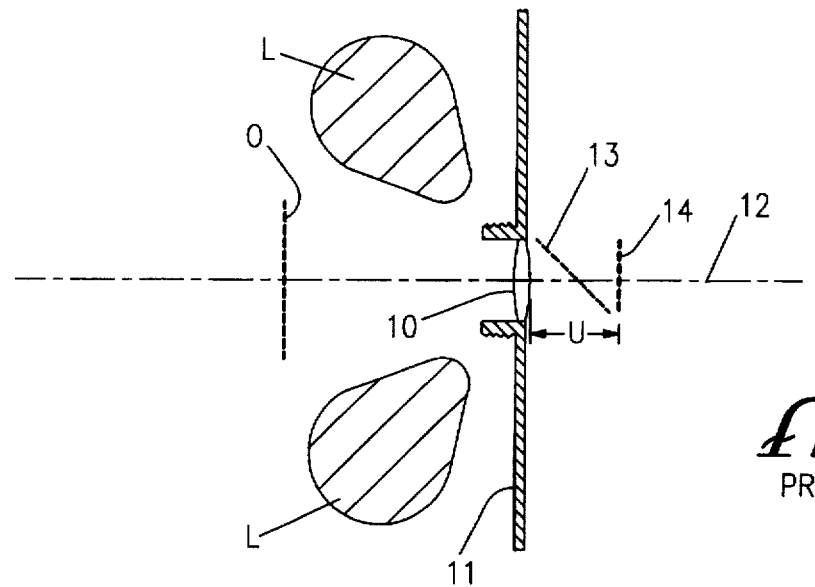
FIG. 1 is a diagrammatic illustration of a prior art optical system for a film or video camera.
Figure 2:
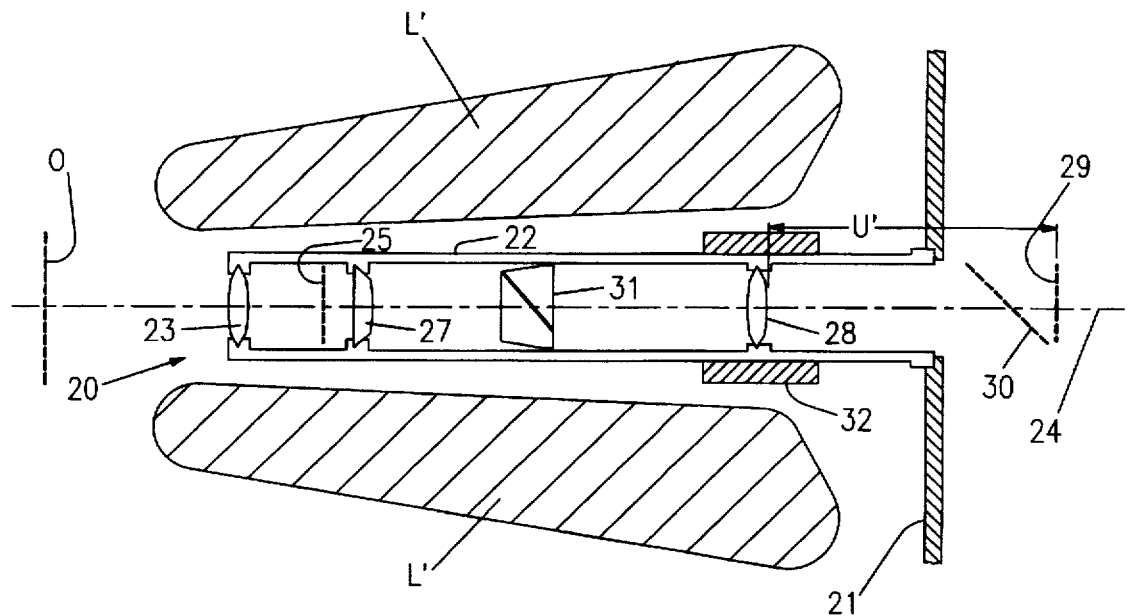
FIG. 2 is a diagrammatic illustration of the optical system of the present invention.

Referring to FIG. 2, the optical system 20 of the present invention is illustrated in its simplest form as mounted on the front face 21 of a camera (not shown), which front face 21 is the same as or comparable to the front face 11 illustrated in FIG. 1 of any type of motion picture, still or video camera or the like. The lenses of the optical system 20 are positioned in a lens cylinder or barrel 22 that is mounted on the front face 21 of the camera and throughout this specification and the claims the references to "lens", "lenses", "lens group" and "lens means" shall mean and include any form of single lens or multiple element lens with or without an iris for aperture adjustment and any such lens either can be selected from commercially available lenses or specifically created for use in the optical system of this invention. An objective lens 23, sometimes referred to as a taking lens, is mounted in the forward end of the barrel 22 on the optical axis 24 for forming a first or intermediate image 25 within the barrel 22 of the object O which, as with the object O of FIG. 1, may be positioned close to the front of the lens 23. A field lens 27 is positioned behind the objective lens 23 toward the camera and the spacing between the objective lens 23 and field lens 27 is such that the intermediate image 25 is formed in or near the field lens 27, either in front or back of the field lens 27. The intermediate image 25 is shown at a distance in front of the field lens 27 in FIG. 2 and other Figures only for convenience and clarity of illustration. A relay lens 28 is provided in the barrel 22 on the optical axis 24 between the field lens 27 and the camera for forming a second or final image 29 on the film plane of a movie or still camera or the CCD detector plane of a video camera. The distance U' between the relay lens 28 and the image plane of the final image 29 can be of any desired amount, as those skilled in the art will understand, but usually will be relatively large whereby there is adequate space for the reflex mirror 30 of the film camera or the beamsplitter of a video camera and other elements, as discussed below. The relay lens 28 may be a macro lens.

In the event only a single intermediate image 25 is formed in the optical system 20 between the objective lens 23 and the final image 29, the final image 29 will be inverted and reversed, and therefore a Pechan prism 31 or the like may be provided in the barrel 22 for inverting and reversing (reverting) the image to provide the normal orientation of the final image 29 in the camera. The Pechan prism 31 is preferably of a roof or roof edge type but any prism or combination of mirrors that inverts and reverts the image be used. As used throughout this specification, "Pechan prism" shall mean the preferred roof edge Pechan prism or any optical equivalent.

In the optical system of FIG. 2, the lens or lens groups 23, 27 and 28 may be of normal diameters whereby the diameter of the barrel 22 is relatively normal, rather than being very large as required by some special wide angle optical systems. On the other hand, the optical system 20 is very long along the optical axis 24 whereby there is substantial space, as shown by the cross hatched areas L' surrounding the barrel 22, for providing lighting of the front of the object O to be photographed even though the object O is close to the end of the barrel 22.

In order to obtain all of the advantages of the optical system 20 of the present invention, it is preferred that the lens groups 23, 27 and 28 and their positioning be such that the intermediate image 25 formed by the objective lens group 23 be larger than the final image 29, which provides an increased field of view of the entire imaging system as will be discussed more fully below in connection with FIGS. 3–10. Moreover, it is preferred that the objective lens group 23 be fixed at infinity focus and full aperture for maximizing the field of view and minimizing the problems of focusing on the closely spaced object O. Further, it is preferred that the field lens group 27 be fixed in the barrel 22 in the desired location from the fixed objective lens 23. Still further, it is preferred that the relay lens group 28 be provided with an adjustable iris for adjusting the aperture and that one or more lenses of the relay lens group 28 be adjustable along the optical axis 24 for focusing the final image 29, such as by an external adjustment ring assembly 32. By this preferred arrangement, the objective lens group 23 may be readily interchanged with other objective lens groups selected from commercially available lenses, as identified below, or specially constructed lens groups without otherwise modifying the optical system 20, similar to the manner in which other lens assemblies are interchangeably mounted on the front face 21 of a camera. By way of example and without limiting the scope of this invention, the objective lens 23 may be a Nikon 20 mm f/4, Nikon 28 mm f/2.8 or Nikon 50 mm f/1.4, the field lens group 27 may be any multi-element lens with a focal length of about 25 mm to 50 mm and the relay lens group 28 may be a Nikon Micro-Nikkor 105 mm f/2.8 or Nikon Micro-Nikkor 200 mm f/4 (although a field lens group 27 with a longer focal length, perhaps 100 mm, is preferred when the relay lens group has a 200 mm focal length), all of which have been tested successfully in this optical system. One specific combination that has been tested successfully is a Nikon 50 mm f/1.4 lens as the objective lens 23, a 50 mm field lens as the field lens 27 spaced at about the focal length from the objective lens 23, and a +4 diopter attachment and Micro-Nikkor 105 mm f/2.8 as the relay lens 28 spaced 3.25 inches from the field lens 27, with the aperture of the relay lens set between f11 and f16. It may be advantageous to use an objective lens having a focal length less than 20 mm, which has not been tested, but at present it seems unlikely that normally it would be advantageous to use an objective lens 23 having a focal length of greater than 50 mm. Also, a zoom lens may be used advantageously as the objective lens 23 and may be either a continuously variable focal length type or a multiple discrete focal length type, with an appropriate field lens 27, for conveniently selecting a desired focal length without changing lenses. The overall length of the optical system 20 can be substantially increased or decreased by the particular selection of the relay lens group 28 such as, for example, by using a 200 mm focal length relay lens 28, the optical system 20 will be about 18 inches to 24 inches long, depending on the other lens groups, which is longer than a system using a 105 mm focal length relay lens.

Referring now to FIGS. 3–6, the principle by which the effective field of view is increased by the optical system of this invention will be described in connection with a conventional 35 mm movie film 35. The movie film 35 illustrated in FIG. 3 is of the common four perforation type wherein the film is advanced downwardly in the direction of arrow 36 a distance of four perforations for each picture frame 37. By cinematography industry standards, the center line 38 of the picture frame 37 is offset from the center line 39 of the film 35 by 0.050 inches to provide space between the picture frame 37 and the perforations 40 along one side of the film 35 for a sound track 41. The typical industry standard size of the picture 37 is a height H of 0.735 inches and a width W of 0.868 inches. In the top or plan view FIG. 4, the film 35 is shown immediately behind an aperture plate 42 having an aperture 43 of the width W, i.e. 0.868". With an objective lens 44 having a focal length F in a conventional optical system, the field of view angle A which the objective lens 44 can transmit to the film 35 is limited by the mathematical relationship between the focal length F and the aperture and picture width W which is expressed by the following formula:

$$\text{Tangent}\frac{A}{2} = \frac{W}{2} \div F$$

Assuming the objective lens 44 has a relatively common 50 mm focal length F and the width W is 0.868 inches, as described above, the angle A of the field of view is 24.86° according to the above formula and as shown in FIG. 4. In other words, the field of view of a 50 mm objective lens in a conventional 35 mm movie film optical system is limited to 24.86° in the horizontal direction, which is only 12.43° on either side of the optical axis 12 and objects beyond that field of view will not be reproduced on the film picture 37 because they will be beyond the width W of the aperture 43 even if the iris in the objective lens 44 is fully opened. Obviously, the "field of view" in the vertical direction is even more limited because the height H of the film frame 37 is less than the width W.

In the top plan view FIG. 5 of a portion of the optical system of the present invention, the objective lens 23 is again assumed to be a lens having a focal length F of 50 mm but here, unlike a conventional system, the objective lens 23 forms the intermediate image 25 of a larger width W' of any desired size because the size is not limited by the picture frame width and aperture width W. By way of example, without limiting the scope or application of the present invention, the intermediate image 25 may be formed with a width W' of 1½ times the width W. In other words, width W' equals 1.302 inches (0.868+0.434) and the field of view angle A' of this intermediate image 25 is again a mathematical function, according to the above formula, of the focal length F of 50 mm and the width W' of 1.302 inches, namely, the angle A' is 36.54°. In other words, in this example, the field of view at the intermediate image 25 of the optical system of the present invention is nearly 12° or 50% larger than a conventional system even though the same 50 mm objective lens is used. This larger intermediate image 25 is then transmitted by the field lens group 27 and relay lens group 28 to form the same image as the final image 29 but of the smaller width W. This creates the effect illustrated in FIG. 6 of having an objective lens 23' in a conventional system, such as shown in FIG. 4, that produces an image of the width W but has a field of view angle A' (36.54°) whereby the effective focal length F' is only 33.4 mm, which again is calculated by the above formula. By increasing the effective field of view of the objective lens in the optical system 20 of this invention, the background visible beyond the closely positioned object O is substantially increased and yet the close object O and the background are both in focus thereby producing the effect of a substantially increased depth of field by the optical system 20. In effect, the optical system 20 simulates a wide angle lens system with improved depth of field of focus which has been observed by photographing a small object O located a short distance from the objective lens 23 with that object O in focus as well as objects at a relative large optical distance, up to infinity, being in focus.

Referring now to FIGS. 7–10 which are similar to FIGS. 3–6, respectively, but illustrate the use of 35 mm film in a still camera and the comparison between a conventional optical system and the optical system 20 of the present invention. In a still camera, the 35 mm film 35' is advanced in the horizontal direction of arrow 36' in an amount equal to eight perforations 40' for each picture frame 37'. Although the film stock for motion picture film 35 and still camera film 35' may be identical, the picture frame 37' of a still picture is centered on the center line 38 of the film and has a width SW of 1.485 inches and a height SH of 0.991 inches. In other words, the width SW of a still picture frame 37' is slightly larger than twice the height H of a movie picture frame 37 and the height SH of a still picture frame 37' is slightly larger than the width W of a movie picture frame 37. Referring to top plan view FIG. 8, the film 35' moves behind the aperture wall 42' having an aperture 43' of a width SW, that is, the width of the picture frame 37'. Again, with a conventional objective lens 44' having a focal length F in this still camera arrangement, the field of view angle SA has the mathematical relationship to the aperture/film width SW and the focal length F, as follows:

$$\text{Tangent}\frac{SA}{2} = \frac{SW}{2} \div F$$

Assuming the focal length F of the objective lens 44' is 50 mm (the same as in the illustration of FIG. 4), the field of view angle SA will be 41.33° which is larger than the movie film example of FIG. 4 because the aperture/film width SW of still film is larger than the aperture/film width W of movie film. Referring to FIG. 9, if an objective lens 23 of the optical system 20 of this invention having a focal length F of 50 mm is used to produce an intermediate image 25 of a width SW' of 1½ times the width SW, then the field of view angle SA' of this intermediate image 25 equals 50.90° which is 17.57° larger than field of view angle SA. Referring to FIG. 10, which is similar to FIG. 6, this expanded field of view angle SA' of 58.90° produces an image of the width SW as though the objective lens 23 has a focal length F' of 33.4 mm. Again, as with the example of the movie film application of FIGS. 3-6, the effective focal length of the objective lens 23 of the optical system 20 of this invention is reduced by about one third to create the effect of a wider angle lens than is actually used as the objective lens and an apparent increase in the depth of field.

Figure 11:
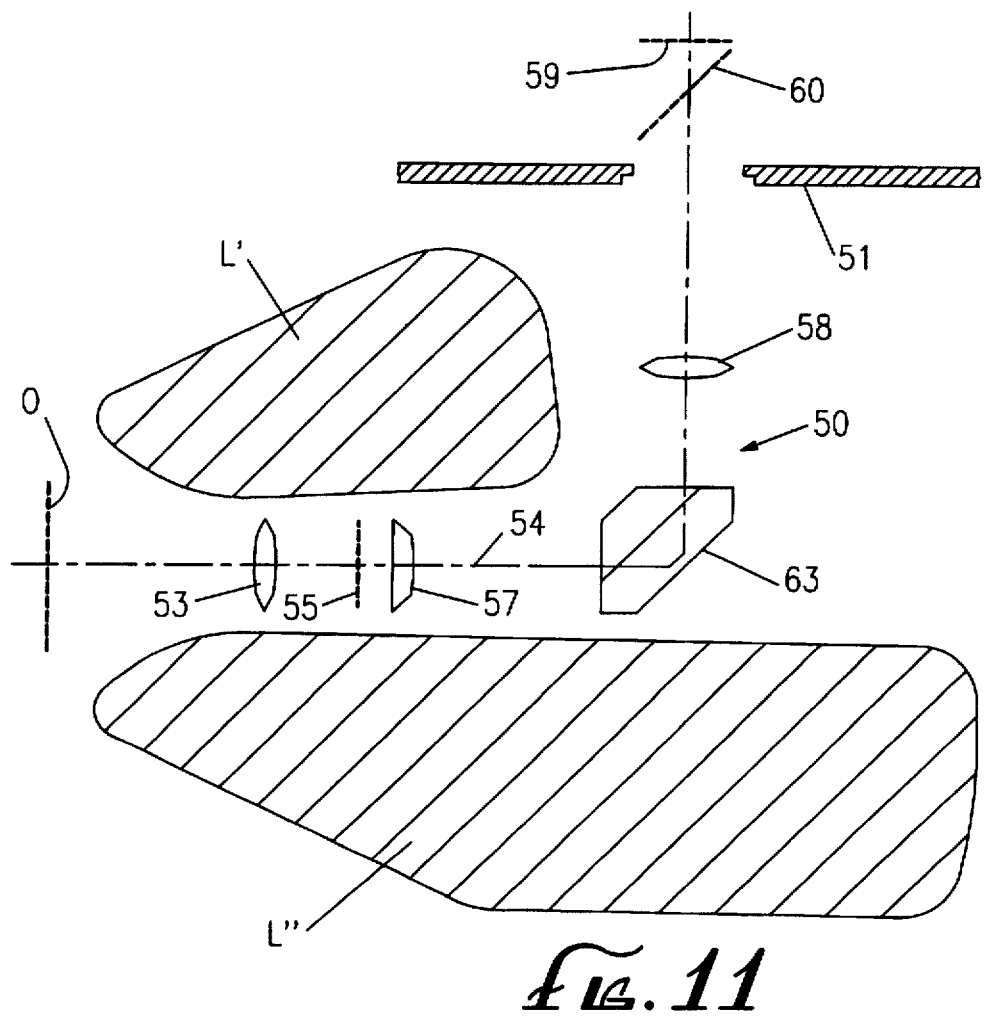
FIG. 11 is a diagrammatic illustration of a modified form of the optical system of the present invention.

Referring now to the modification of the present invention shown in FIG. 11 which diagrammatically illustrates the optical system, generally designated 50, without the normal surrounding barrel, such as barrel 22 of optical system 20 in FIG. 2. From the front end of the optical system 50 closest to the near object O to be photographed, the optical system 50 includes an objective lens 53 for forming an intermediate image 55 that is transmitted by a field lens 57 through an Amici prism 63 to turn the optical axis 54 90° for the light radiation to pass through a relay lens 58 to the reflex mirror 60 to form the final image 59 in the camera behind the face 51. The objective lens 53, field lens 27 and relay lens 58 may be the same as the objective lens 23, field lens 27 and relay lens 28 of optical system 20. Essentially, the optical system 50 is the same as the optical system 20 of FIG. 2 except for the inclusion of the Amici prism 63 for deviating, bending or turning the optical axis 54 by 90°. The Amici prism 63 is provided with a roof edge and also serves to invert and revert the image whereby the Pechan prism 31 provided in the optical system 20 for inverting or reverting the image is not needed in the optical system 50. By this arrangement the camera can be oriented at 90° to the direction of the object O for obtaining special photographic effects, such as being able to photograph a small object O sitting on the ground or floor. Again, because of the length of the optical axis 54, even though it is turned 90°, there is adequate space, shown by the cross hatched areas L' and L", for lighting the near object O positioned close to the objective lens 53. In fact, the area L" directly below and on the sides of the lens system is not limited by the camera.

Figure 12:
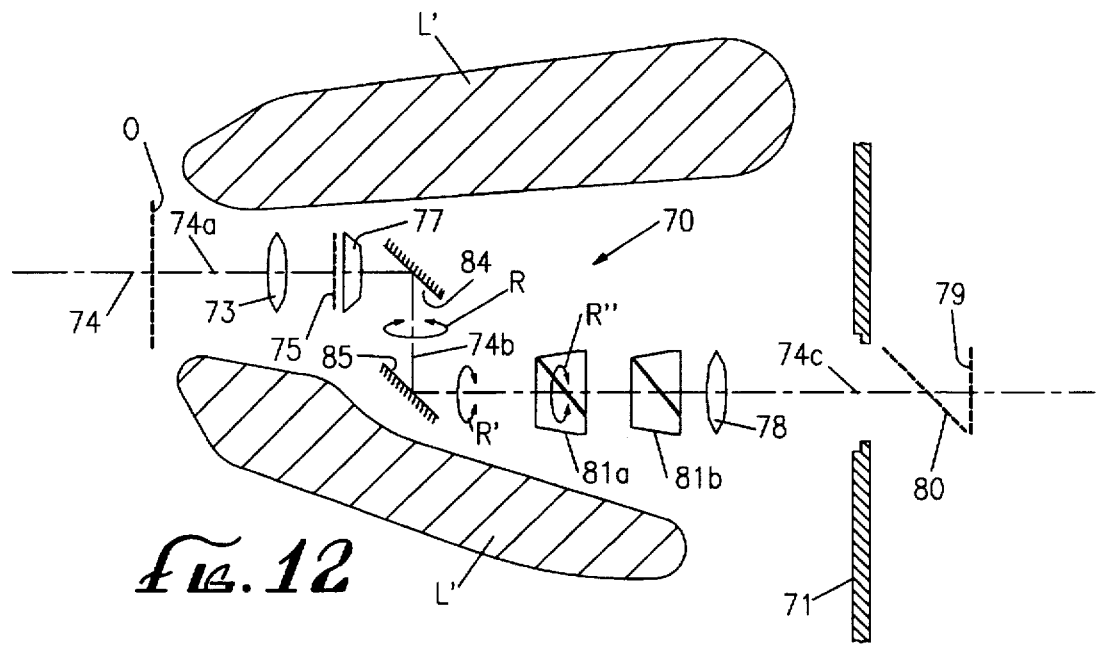
FIG. 12 is a diagrammatic illustration of another modified form of the optical system of the present invention.

Referring now to the modification of the present invention shown in FIG. 12, the optical system, generally designated 70, is substantially similar to the above-described optical systems 20 and 50 illustrated in FIGS. 2 and 11, respectively. On the optical axis 74 from the object O to the final image 79, there is provided an objective lens 73 (like objective lens 23 and 53) forming an intermediate image 75 that is transmitted through a field lens 77 (like field lens 27 and 57) to a fold mirror 84 that turns the optical axis portion 74a by 90°, shown as optical axis portion 74b, to another fold mirror 85 that turns the optical axis another 90°, shown as optical axis portion 74c, which is in a plane parallel to the plane of the optical axis portion 74a. Along the optical axis portion 74c there is provided a first Pechan prism 81a, a second Pechan prism 81b and a relay lens group 78 to transmit the light to the reflex mirror 80 and form the final image 79 in back of the face 71 of the camera. The fold mirrors 84 and 85 may also be mining prisms. The barrels for containing the optical system 70 are provided with rotatable joints, which will be described in connection with FIGS. 14 and 15, at fold mirrors 84 and 85 to allow the barrel enclosing optical axis 74a to be rotated about the optical axis 74b as shown by the arrow R and for the optical axis 74b to be rotated about the optical axis 74c as shown by the arrow R'. The Pechan prism 81b is mounted in the barrel in a fixed position with respect to the face 71 of the camera to invert the image to be formed as the final image 79, which is the same function performed by the Pechan prism 31 described in connection with the optical system 20 of FIG. 2. The Pechan prism 81a is rotatable about the optical axis 74c, as shown by arrow R" for correcting the orientation of the final image 79 caused by rotating the barrels in the directions of arrows R and R'. By this optical system 70 of the invention, the versatility of the different positions of the camera and the objective lens 73 is greatly increased and the optical system has the ability of being rotated in one or both of the optical axes 74b and 74c to follow a moving object without moving the camera merely by guiding the barrel surrounding the optical axis portion 74a to follow the object. Again, the length of the optical axis 74 provides space, shown by the cross hatched areas L' for lighting the front of the object O, as with the previously described embodiments of this invention.

Figure 13:
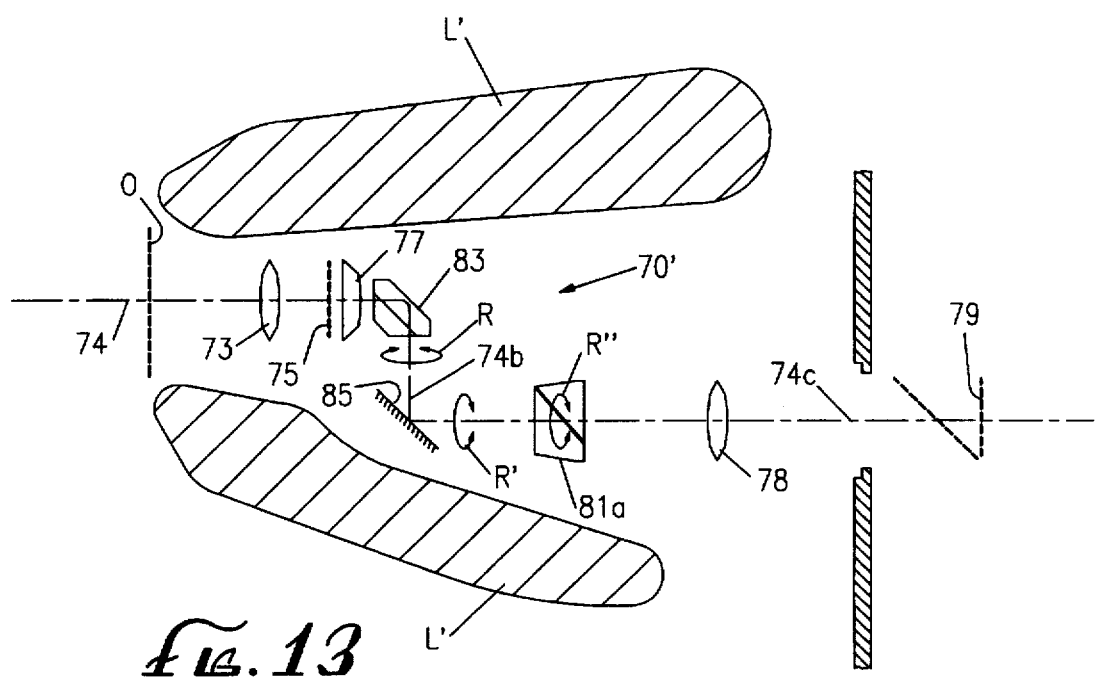
FIG. 13 is a diagrammatic illustration of still another modified form of the present invention.

Referring now to FIG. 13, an optical system 70' is shown that is substantially the same as the optical system 70 of FIG. 12 and components of the optical system 70' that are the same as the optical system 70 will be identified by the same numerals with a detailed description thereof being omitted. The differences between optical system 70' of FIG. 13 and optical system 70 of FIG. 12 is that the Pechan prism 81b for inverting the final image 79 is omitted and folding mirror 84 is replaced by an Amici prism 83, similar to Amici prism 63 in the embodiment of FIG. 11, for inverting the final image 79. This simplifies the optical system and reduces its cost without sacrificing the versatility of the optical system 70 illustrated in FIG. 12.

In each of the modifications of the present invention shown in FIGS. 11, 12 and 13, the folding mirrors and prisms may be located anywhere along the optical axis of the system and various types of equivalent optical elements may be used for accomplishing the functions of these mirrors and prisms, as well as the functions of the lens groups.

Referring now to FIGS. 14 and 15, a simplified exterior view is shown of the lens cylinder or barrel assembly, generally designated 90, which is adapted to contain the optical system of this invention, as shown and described with respect to FIGS. 12 and 13, wherein there are two 90° bends or deviations in the optical axis 74 of the optical system. The lens barrel assembly 90 includes the objective lens group 73 which is detachably connected to the face 91 of a first barrel section 92 containing the folding mirror 84 of the optical system 70 or the Amici prism 83 of the optical system 70'. A second barrel section 93 containing the folding member 85 of optical system 70 or 70' is rotatably connected by a flange 94 to a flange 95 on the first barrel section 92 for allowing rotation about the optical axis portion 74b, as shown by arrow R in FIGS. 12 and 13. A lock mechanism 96 may be provided for selectively locking the tubular sections 92 and 93 against relative rotation. Similarly, a selectively operable rotation joint 97 is provided between barrel section 93 and a third barrel section 98 of the barrel assembly 90 for allowing selective rotation of tubular section 93 about the optical axis portion 74c as shown by arrow R', in FIGS. 12 and 13. The relay lens 78 is provided at the base of barrel section 98 adjacent the camera face 71. The field lens 77 can be provided at any convenient location in the barrel assembly 90 and is not shown. An external adjustment ring 99 may be provided on the barrel tubular section 98 for adjusting the angular position of an internal element, such as the Pechan prism 81a (not shown). Other conventional devices and adjustments may be provided in the barrel assembly 90, such as a removable filter 100. The shape, diameter, etc. of the barrel assembly 90 is unimportant to this invention except to the extent that it must accommodate an optical system, such as the optical systems 70 and 70' described above, and provide all of the degrees of motion and adjustment that may be required. For example, the barrel portion 98 could be much shorter and a lengthy barrel portion provided between the barrel portions 92 and 93 or the barrel portion 92 could be much longer with a shorter barrel portion 98.

Although a specific embodiment of the present invention has been described with several variations and modifications, including specific prisms and lenses, it is to be understood and will be appreciated by those skilled in the art that the present invention may be practiced by using various other components and elements in different arrangements for accomplishing the same functions as this wide angle, deep field, close focusing optical system.

What is claimed is:

1. An optical system comprising an objective lens, a field lens and relay lens aligned on an optical axis in that order, said objective lens accepting radiation from an object in space and forming a first image between said objective lens and said relay lens, said field lens collecting and transferring radiation from said first image to said relay lens to form a final image at an image detection means, wherein in said optical system the size of said first image is greater than the size of said final image and wherein said optical system includes focusing and aperture controls located within said relay lens.

2. An optical system according to claim 1, having image orientation correction optics located between said objective lens and said relay lens for inverting and reverting the first real image to the final image.

3. An optical system according to claim 1 having image orientation correction optics located between said field lens and said relay lens for inverting and reverting the first image to the final image.

4. An optical system according to claim 1 having optical axis deviation optics located between said objective lens and said relay lens for causing deviation of the optical axis.

5. An optical system comprising an objective lens, a field lens and relay lens aligned on an optical axis in that order, said objective lens accepting radiation from an object in space and forming a first image between said objective lens and said relay lens, said field lens collecting and transferring radiation from said first image to said relay lens to form a final image at an image detection means, wherein in said optical system the size of said first image is greater than the size of said final image, and optical axis deviation optics located between said objective lens and said relay lens for causing deviation of the optical axis wherein means are provided for allowing rotation of the deviated optical axis of a first portion of the optical system in a plane at an angle to the optical axis of a second portion of the optical system at the location of said optical axis deviation optics, said relay lens being located on a portion of the optical axis that intersects the final image and including focusing and aperture control means.

6. An optical system according to claim 5 having second optical axis deviation optics between said objective lens and said field lens, and second means are provided for allowing rotation of the deviated optical axis of said second portion of the optical system in a plane at a second angle to the optical axis of a third portion of the optical system at the location of said second optical axis deviation optics.

7. An optical system according to claim 6, wherein said first and second angles are each 90°.

8. An optical system according to claim 5, wherein image orientation correction means are rotatably provided on the optical axis for adjustably correcting the image orientation as said first portion of the optical axis is rotated relative to said second portion of the optical axis.

9. An optical system according to claim 5, wherein said optical axis deviation optics includes means for inverting the image between said first image and said final image.

10. An optical system according to claim 9, wherein means are provided for allowing rotation of the deviated optical axis of a first portion of the optical system in a plane at an angle to the optical axis of a second portion of the optical system at the location of said optical axis deviation optics.

11. An optical system according to claim 10 having second optical axis deviation optics between said objective lens and said field lens, and second means are provided for allowing rotation of the deviated optical axis of said second portion of the optical system in a plane at a second angle to the optical axis of a third portion of the optical system at the location of said second optical axis deviation optics.

12. An optical system according to claim 11, wherein said first and second angles are each 90°.

13. An optical system according to claim 10, wherein image orientation correction means are rotatably provided on the optical axis for adjustably correcting the image orientation as said first portion of the optical axis is rotated relative to said second portion of the optical axis.

14. An optical system comprising an objective lens, a field lens and relay lens aligned on an optical axis in that order, said objective lens accepting radiation from plural objects in space located at plural distances, said objective lens forming a first image between said objective lens and said relay lens, said field lens collecting and transferring radiation from said first image to said relay lens to form a final image at an image detection means, wherein in said optical system the size of said first image is greater than the size of said final image, wherein said objective lens is provided with a substantially fully open aperture and focused at infinity, and wherein each of the plural objects is simultaneously and substantially in focus as said final image even when the plural distances of the plural objects range from an object at optical infinity to a close object.

15. An optical system comprising an objective lens, a field lens and a relay lens aligned on an optical axis, said objective lens accepting radiation from an object in space and forming a first image, said field lens collecting and transferring radiation from said first image to said relay lens to form a final image at an image detection means, said first image having a size greater than the size of said final image, and wherein said relay lens is a macro lens and includes aperture and focus adjusting means.

16. An optical system according to claim 1, 5, 14, or 15, wherein said objective lens is a zoom lens.

17. An optical system comprising an objective lens, a field lens and a relay lens aligned on an optical axis in that order, said objective lens accepting radiation from plural objects in space located at plural distances, respectively, from said objective lens and forming a first image between said objective lens and said relay lens, said field lens collecting and transferring radiation from said first image to said relay lens to form a final image at an image detection means, said objective lens being set and fixed at a full aperture and focused at infinity, and optical system focusing and aperture controls located within said relay lens.

18. An optical system according to claim 17 having image orientation optics located between said objective lens and said relay lens.

19. An optical system according to claim 17 having image orientation correction optics located between said field lens and said relay lens.

20. An optical system according to claim 17 or 18 having optical axis deviation optics located between said field lens and said relay lens.

21. An optical system for connecting between an objective lens and a camera, comprising lens means for optically transmitting an intermediate image formed by the objective lens of plural objects in space located at plural distances, respectively, from said objective lens to an image plane in the camera, said lens means including a relay lens having aperture adjustment and focusing means for forming a final image in focus and of a smaller size than said intermediate image for reducing the effective focal length of the objective lens by increasing the effective field of view of the objective lens, wherein said final image is a high photographic-quality image for the camera, and wherein each of the plural objects is simultaneously and substantially in focus as said final image even when the plural distances of the plural objects range from an object at optical infinity to a close object.

22. An optical system for connecting between an objective lens and a camera for photographing plural objects located at plural distances, respectively, comprising a lens group for optically transmitting an intermediate image from the objective lens to an image plane in the camera, said lens group including a relay lens having aperture adjustment and focusing means for forming a final image in focus and of a smaller size than but of substantially the same image content as the intermediate image for increasing the apparent depth of field, wherein said final image is a high photographic-quality image for the camera, and wherein each of the plural objects is simultaneously and substantially in focus as said final image even when the plural distances of the plural objects range from an object at optical infinity to a close object.

23. An optical system according to claim 21 or 22 having optical axis deviation optics located between said objective lens and said image plane for causing deviation of the optical axis.

24. An optical system according to claim 5, 21, or 22, wherein said objective lens is provided with a substantially fully open aperture and focus at infinity.

25. An optical system comprising an objective lens, a field lens and a relay lens aligned on an optical axis in that order, said objective lens accepting radiation from plural objects in space located at plural distances, respectively, from said objective lens and forming a first image, said field lens collecting and transferring radiation from said first image to said relay lens to form a final image at an image detection means, said first image being of a size greater than the size of said final image, and a Pechan prism located on said optical axis between said field lens and said relay lens for rotating the image about the optical axis from said first image to said final image, and wherein each of the plural objects is simultaneously and substantially in focus as said final image even when the plural distances of the plural objects range from an object at optical infinity to a close object.

26. An optical system comprising an objective lens, a field lens and a relay lens aligned on an optical axis in that order, said objective lens accepting radiation from an object in space and forming a first image, said field lens collecting and transferring radiation from said first image to said relay lens to form a final image at an image detection means, said first image being of a size greater than the size of said final image, optical means located on said optical axis for inverting and reverting the orientation of the image from said first image to said final image, and a Pechan prism located between said field lens and said relay lens on said optical axis for rotating the image about the optical axis from said first image to said final image, wherein said optical system includes focusing and aperture controls located within said relay lens.

27. An optical system according to claim 25 or 26 having optical axis deviation optics located between said objective lens and said relay lens for causing deviation of the optical axis.

28. An optical system according to claim 27, wherein means are provided for allowing rotation of the deviated optical axis of a first portion of the optical system in a plane at an angle to the optical axis of a second portion of the optical system at the location of said optical axis deviation optics.

29. An optical system for mounting on a camera comprising an objective lens a field lens and a relay lens aligned on an optical axis in that order, said objective lens forming an intermediate image between the objective lens and the relay lens, said field lens and said relay lens forming a final image at a plane in the camera, said final image being of a high photographic-quality for the camera, said optical axis having first, second and third axis portions with the second axis portion being at an angle to said first and third axis portions, said third axis portion of said optical axis being perpendicular to and centered on said plane in the camera and in a fixed position with respect to the camera when the optical system is mounted on the camera, and said first axis portion being offset from said third axis portion and rotatable about said second axis portion in a plane parallel to said third axis portion.

30. An optical system according to claim 29 further comprising optical means on said optical axis for inverting and reverting said intermediate image before forming said final image.

31. An optical system according to claim 30 wherein said optical means includes means for rotating the image about said third axis portion for orienting said final image.

32. An optical system according to claim 29 further comprising optical means on said optical axis for rotating the image about said third axis portion for orienting said final image.

33. An optical system according to claim 29 wherein said second axis portion is rotatable about said third axis portion.

34. An optical system according to claim 33 wherein said second axis portion is perpendicular to both said first axis portion and said third axis portion.

35. An optical system according to claim 29 wherein said second axis portion is perpendicular to both said first axis portion and said third axis portion.

36. An optical system according to claim 29 wherein said first axis portion is rotatable in all directions and continuously about said second axis portion in said plane parallel to said third axis portion.

37. An optical system according to claim 36 wherein said second axis portion is rotatable in all directions and continuously about said third axis portion.

38. An optical system according to claim 29 wherein said intermediate image is larger than said final image.

39. An optical system according to claim 29 wherein said relay lens includes focusing and aperture control means.

40. An optical system according to claims 33, 34, 35, 36, 37, 38, or 39 further comprising optical means on said optical axis for inverting and reverting said intermediate image before forming said final image.

41. An optical system according to claim 40 wherein said optical means includes means for rotating the image about said third axis portion for orienting said final image.

42. An optical system according to claims 33, 34, 35, 36, 37, 38 or 39 further comprising optical means on said optical axis for rotating the image about said third axis portion for orienting said final image.

43. An optical system for mounting on a camera comprising an objective lens, a field lens and a relay lens aligned on an optical axis in that order and mounted in a barrel assembly, said objective lens forming an intermediate image between the objective lens and the relay lens, said field lens and said relay lens forming a final image at a plane in the camera, said barrel assembly including first, second and third barrel sections with said third barrel section having means for mounting on the camera, said optical axis having first, second and third axis portions located respectively in said first, second and third barrel sections, said second axis portion being at an angle to both said first and third axis portions, said third axis portion of said optical axis being perpendicular to and centered on said plane in the camera and in a fixed position with respect to the camera when the optical system is mounted on the camera, means on said first and second barrel sections for allowing selective rotation of said first barrel section about said second axis portion of said second barrel section, means on said second and third barrel sections for allowing selective rotation of said second barrel section about said third axis portion of said third barrel section, said first barrel section and said first axis portion being offset from said third barrel section and said third axis portion and rotatable about said second axis portion in a plane parallel to said third axis portion, and optical means on said optical axis for causing said final image to have the same orientation as an object from which light rays are received by said objective lens including right to left, top to bottom and horizontal and vertical orientation and said final image being of a high photographic-quality for the camera.

44. An optical system according to claim 43 wherein said optical means includes means for inverting and reverting said intermediate image before forming said final image.

45. An optical system according to claim 43 or 44, wherein said optical means includes means in said third barrel section for rotating the image about said third axis portion for correcting the horizontal and vertical orientation of said final image.

46. An optical system according to claim 45, wherein said means for rotating the image comprises a Pechan prism rotatably mounted in said third barrel section.

47. An optical system according to claim 43, wherein said second axis portion is perpendicular to both said first axis portion and said third axis portion.

48. An optical system according to claim 43, wherein said first barrel section and first axis portion are rotatable for 360° in all directions and continuously about said second axis portion in said plane parallel to said third axis portion.

49. An optical system according to claim 43 or 48 wherein said second barrel section and second axis portion are rotatable for 360° in all directions and continuously about said third axis portion.

50. An optical system according to claim 43, wherein said intermediate image is larger than said final image.

51. An optical system according to claim 43, wherein said relay lens includes focusing and aperture control means.

52. An optical system according to claim 43, wherein said field lens is located in said first barrel section, said intermediate image is formed on said first axis portion in said first barrel section and is larger than said final image, said second axis portion is perpendicular to both said first axis portion and said third axis portion, said first barrel section and first axis portion are rotatable for 360° in all directions and continuously about said second axis portion in said plane parallel to said third axis portion, and said second barrel section and second axis portion are rotatable for 360° in all directions and continuously about said third axis.

53. An optical system comprising an objective lens, a field lens and relay lens aligned on an optical axis in that order, said objective lens accepting radiation from an object in space and forming a first image between said objective lens and said relay lens, said field lens collecting and transferring radiation from said first image to said relay lens to form a final image at an image detection means, and wherein said optical system includes focusing and aperture controls located within said relay lens.

54. An optical system according to claim 53, having image orientation correction optics located between said objective lens and said relay lens for inverting and reverting the first image to the final image.

55. An optical system according to claim 53 having image orientation correction optics located between said field lens and said relay lens for inverting and reverting the first real image to the final real image.

56. An optical system according to claim 53 having optical axis deviation optics located between said objective lens and said relay lens for causing deviation of the optical axis.

57. An optical system for mounting on a camera having an image plane, comprising, a barrel assembly including first, second and third barrel sections with said third barrel section having means for mounting on the camera, an optical axis extending through said barrel assembly and having first, second and third axis portions located respectively in said first, second and third barrel sections, said second axis portion being at an angle to both said first and third axis portions, said third axis portion of said optical axis being perpendicular to and centered on the image plane in the camera and in a fixed position with respect to the camera when the optical system is mounted on the camera, first cooperating means on said first and second barrel sections for allowing selective rotation of said first barrel section about said second axis portion of said second barrel section, second cooperating means on said second and third barrel sections for allowing selective rotation of said second barrel section about said third axis portion of said third barrel section, said first barrel section and said first axis portion being offset from said third barrel section and said third axis portion, optical means mounted in said first and second barrel sections for causing the optical axis to deviate from said first axis portion to said second axis portion and from said second axis portion to said third axis portion, respectively, an objective lens and a field lens located on said first axis portion, said objective lens forming an intermediate image at said field lens, a relay lens located on said third axis portion for relaying the intermediate image to the image plane in the camera, and said optical means including means on said optical axis for causing said final image to have the same orientation as an object from which light rays are received by said objective lens including right to left, top to bottom and horizontal/vertical orientation.

58. An optical system according to claim 57, wherein said optical means for causing deviation of the optical axis includes means for inverting and reverting said intermediate image before forming said final image.

59. An optical system according to claim 57 or 58, wherein said optical means includes a selectively rotatable prism in said third barrel section for rotating the image about said third axis portion for correcting the horizontal/vertical orientation of said final image.

60. An optical system according to claim 59, wherein said selectively rotatable prism for rotating the image comprises a Pechan prism rotatably mounted in said third barrel section, and means for rotating said Pechan prism from externally of said third barrel section.

61. An optical system according to claim 57, wherein said second axis portion is perpendicular to both said first axis portion and said third axis portion.

62. An optical system according to claim 57, wherein said first barrel section and first axis portion are rotatable for 360° in all directions and continuously about said second axis portion.

63. An optical system according to claim 57 or 62, wherein said second barrel section and second axis portion are rotatable for 360° in all directions and continuously about said third axis portion.

64. An optical system according to claim 57, wherein said intermediate image is larger than an image formed on the image plane.

65. An optical system according to claim 57, wherein said relay lens includes focusing and aperture control means.

66. An optical system according to claim 57, wherein said field lens is located in said first barrel section, said intermediate image is formed on said first axis portion in said first barrel section and is larger than a image formed on the image plane, said second axis portion is perpendicular to both said first axis portion and said third axis portion, said first barrel section and first axis portion are rotatable for 360° in all directions and continuously about said second axis portion in a plane parallel to said third axis portion, and said second barrel section and second axis portion are rotatable for 360° in all directions and continuously about said third axis.

67. An optical system according to claim 57, wherein said optical means for causing deviation of the optical axis includes one mirror and one prism.

68. An optical system according to claim 57, wherein said optical means for causing deviation of the optical axis includes two mirrors.

69. An optical system according to claim 57, wherein said first and second barrel sections are each substantially shorter than said third barrel section.

70. An optical system according to claim 57, wherein said first cooperating means allows continuous rotation of said first barrel section relative to said second barrel section and includes means for locking said first barrel section to said second barrel section at any location of relative rotation.

71. An optical system according to claim 57 or 70, wherein said second cooperating means allows continuous rotation of said second barrel section relative to said third barrel section and includes means for locking said second barrel section to said third barrel section at any location of relative rotation.

72. An optical system according to claim 57, 58, 61, 62, 64, 65, 66, 67, 68 or 70, wherein said second optical axis is of a length substantially equal to a diameter of said third barrel section for closely coupling said first and third barrel sections, said first barrel section is of a minimum length for accommodating said objective lens and field lens, said third barrel section being substantially longer than said first and second barrel sections, and said optical means including a selectively rotatable prism mounted in said third barrel section on said third axis portion between said second barrel section and said relay lens for selectively orienting the image on the image plane in any desired horizontal/vertical orientation regardless of the relative positions of the camera and first and second barrel sections.

73. An optical system according to claim 72, wherein said selectively rotatable prism for rotating the image comprises a Pechan prism rotatably mounted in said third barrel section, and means for rotating said Pechan prism from externally of said third barrel section.

74. An optical system according to claim 72, wherein said second barrel section and second axis portion are rotatable for 360° in all directions and continuously about said third axis portion.

75. An optical system according to claim 72, wherein said second cooperating means allows continuous rotation of said second barrel section relative to said third barrel section and includes means for locking said second barrel section to said third barrel section at any location of relative rotation.

* * * * *

UNITED STATES PATENT AND TRADEMARK OFFICE
CERTIFICATE OF CORRECTION

PATENT NO. : 5,727,236
DATED : March 10, 1998
INVENTOR(S) : James A. Frazier

It is certified that error appears in the above-identified patent and that said Letters Patent is hereby corrected as shown below:

Column 6, line 64, after "equals" delete "50.90°" and substitute -- 58.90° --.

Signed and Sealed this

Twenty-fifth Day of July, 2000

Attest:

Q. TODD DICKINSON

Attesting Officer

Director of Patents and Trademarks